(12) United States Patent
Gresillon et al.

(10) Patent No.: US 10,641,913 B2
(45) Date of Patent: May 5, 2020

(54) VIBRATORY SOURCE FOR NON-VERTICAL BOREHOLES AND METHOD

(71) Applicant: CGG SERVICES SAS, Massy (FR)

(72) Inventors: François-Xavier Gresillon, Rully (FR); Eric Forgues, Bures-sur-Yvette (FR)

(73) Assignee: CGG SERVICES SAS, Massy (FR)

( * ) Notice: Subject to any disclaimer, the term of this patent is extended or adjusted under 35 U.S.C. 154(b) by 311 days.

(21) Appl. No.: 15/552,962

(22) PCT Filed: Dec. 15, 2015

(86) PCT No.: PCT/IB2015/002586
§ 371 (c)(1),
(2) Date: Aug. 23, 2017

(87) PCT Pub. No.: WO2016/156914
PCT Pub. Date: Oct. 6, 2016

(65) Prior Publication Data
US 2018/0038972 A1    Feb. 8, 2018

Related U.S. Application Data

(60) Provisional application No. 62/139,000, filed on Mar. 27, 2015.

(51) Int. Cl.
| | |
|---|---|
| *G01V 1/145* | (2006.01) |
| *G01V 1/02* | (2006.01) |
| *G01V 1/52* | (2006.01) |
| *G01V 1/143* | (2006.01) |
| *E21B 49/00* | (2006.01) |

(52) U.S. Cl.
CPC ............. *G01V 1/145* (2013.01); *E21B 49/00* (2013.01); *G01V 1/143* (2013.01); *G01V 1/159* (2013.01); *G01V 1/52* (2013.01)

(58) Field of Classification Search
CPC .......... G01V 1/145; G01V 1/159; G01V 1/52; E21B 49/00
USPC ......................................... 181/106
See application file for complete search history.

(56) References Cited

U.S. PATENT DOCUMENTS

| | | | |
|---|---|---|---|
| 4,420,826 A | 12/1983 | Marshall, Jr. et al. | |
| 4,805,725 A | 2/1989 | Aulsson | |
| 5,030,873 A | 7/1991 | Owen | |
| 5,742,561 A * | 4/1998 | Johnson ................. | H04R 9/063 |
| | | | 310/334 |
| 6,927,528 B2 | 8/2005 | Barillot et al. | |
| 7,216,738 B2 * | 5/2007 | Birchak ................. | G10K 9/121 |
| | | | 181/101 |
| 7,441,628 B2 * | 10/2008 | Minto ...................... | G01V 1/04 |
| | | | 181/111 |

(Continued)

OTHER PUBLICATIONS

International Search Report and Written Opinion, dated Jun. 29, 2016, from corresponding PCT Application No. PCT/IB2015/002586.

*Primary Examiner* — Forrest M Phillips
(74) *Attorney, Agent, or Firm* — Patent Portfolio Builders PLLC

(57) ABSTRACT

A reaction mass seismic survey source that is located in an underground casing. The seismic source includes a non-planar base plate; a reaction mass located on the non-planar base plate; and a flextensional element housed in a recess of the reaction mass and configured to vibrate the non-planar base plate when actuated, to generate seismic waves underground.

20 Claims, 12 Drawing Sheets

(56) References Cited

U.S. PATENT DOCUMENTS

| | | | |
|---|---|---|---|
| 7,916,578 B2 | 3/2011 | Vlinto et al. | |
| 8,220,583 B2 * | 7/2012 | Botting | G01V 1/523 |
| | | | 181/102 |
| 8,261,873 B2 * | 9/2012 | Richenstev | G01V 1/52 |
| | | | 181/104 |
| 8,973,702 B2 * | 3/2015 | Gresillon | G01V 1/159 |
| | | | 181/104 |
| 10,350,461 B2 * | 7/2019 | Savelli | A63B 39/00 |
| 2007/0045038 A1 * | 3/2007 | Han | G01V 1/02 |
| | | | 181/113 |
| 2009/0129203 A1 | 5/2009 | Jones et al. | |
| 2009/0205899 A1 * | 8/2009 | Geerits | G01V 1/44 |
| | | | 181/106 |
| 2014/0169128 A1 | 6/2014 | Orban et al. | |
| 2014/0328139 A1 | 11/2014 | Minto et al. | |

* cited by examiner

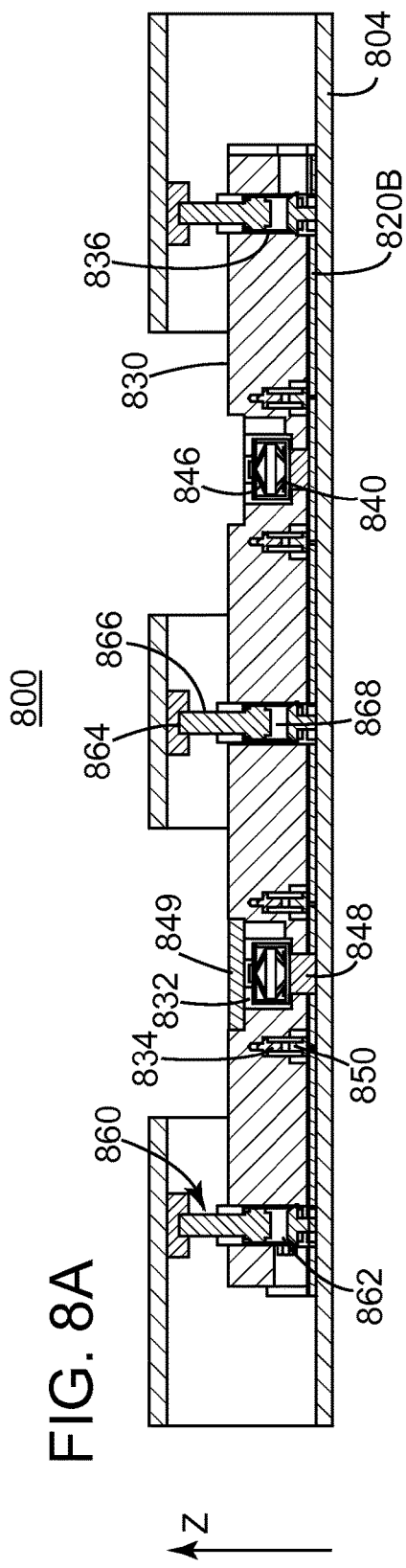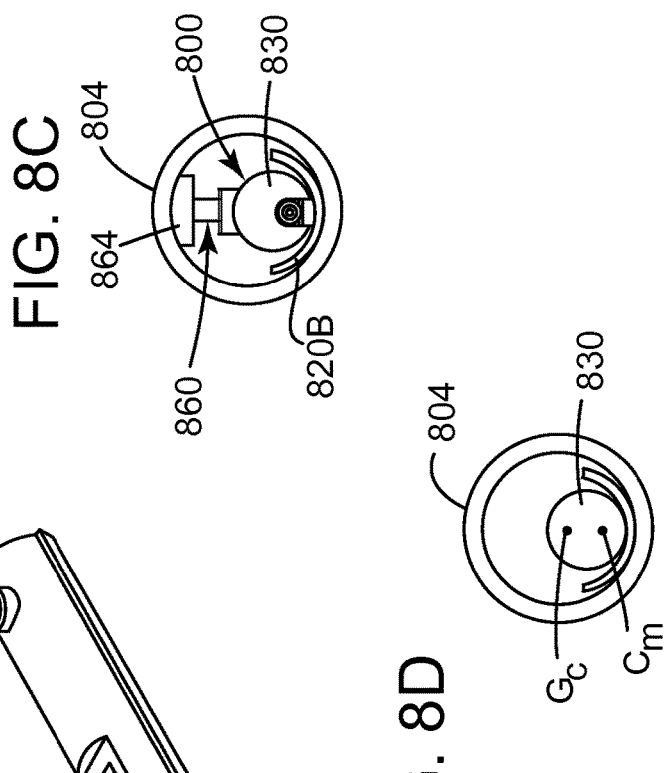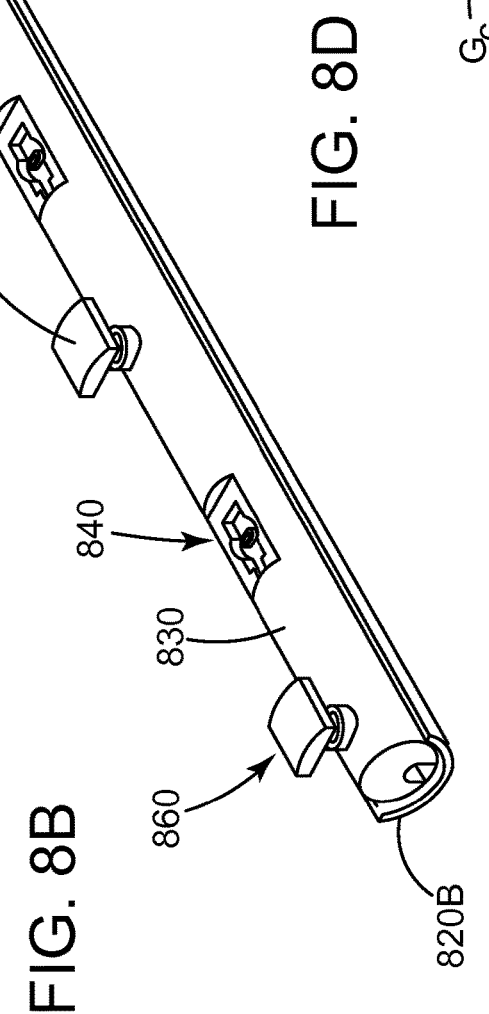

VIBRATORY SOURCE FOR NON-VERTICAL BOREHOLES AND METHOD

CROSS REFERENCE TO RELATED APPLICATIONS

The present application is a National Stage of PCT Application No. PCT/IB2015/002586, filed Dec. 15, 2015, which claims the benefit of priority under 35 U.S.C. § 119(e) to U.S. Provisional Application No. 62/139,000 filed on Mar. 27, 2015, the entire contents of which is hereby incorporated by reference.

BACKGROUND

Technical Field

Embodiments of the subject matter disclosed herein generally relate to devices and methods for generating seismic waves underground and, more particularly, to mechanisms and techniques for generating seismic waves in a borehole underground.

Discussion of the Background

Land seismic sources may be used to generate seismic waves in underground formations for investigating geological structures. A seismic source may be located on the ground or it may be buried in the ground. The seismic source, when activated, imparts energy into the ground. Part of that energy travels downward and interacts with the various underground layers. At each interface between these layers, part of the energy is reflected and part of the energy is transmitted to deeper layers. The reflected energy travels toward the surface of the earth, where it is recorded by seismic sensors. Based on the recorded seismic data (traces), images of the underground layers may be generated. Those skilled in the art of seismic image interpretation are then able to estimate whether oil and/or gas reservoirs are present underground. A seismic survey investigating underground structures may be performed on land or water.

Some examples of seismic sources used in wells are now presented. A seismic source may be driven in an impulsive mode or in a vibratory mode. For example, FIG. 1 illustrates a seismic source 100 configured to operate in an impulsive mode. Seismic source 100 includes a spherical tank 112 filled with fluid 114 (e.g., mineral oil or water) buried underground 116 and in close contact with the ground. At the surface 118, a pump 120 is used to feed fluid into the tank 112, and valves 122 and 124 are used to control the out-flow and in-flow of the fluid between the tank 112 and pump 120. Thus, it is possible to build up pressure in the tank that will expand its volume and then quickly release it, causing a pressure pulse and generating seismic energy.

A cement plug 132 may be provided on top of the tank 112 for burying the source, and a seismic sensor 134 (e.g., hydrophone) may be placed in the tank 112 for measuring the seismic waves produced. Also, a pressure transducer 136 may be provided inside tank 112 for measuring the fluid pressure acting on the walls in contact with the earth. This configuration is best suited when tank 112 is buried at a shallow depth, because if the inlet and outlet lines are too long, the high frequency output of the system may be compromised due to the fluid inertance imposed by long passageways. The fluid inertance will tend to limit the rate at which pressure can change.

Alternatively, the seismic source may be vibratory, as illustrated in FIG. 2. Seismic source 200 has a tank 202 that includes a cavity 204. The same considerations discussed above regarding the shape of the tank 112 apply to tank 202. An actuation mechanism (e.g., piston arrangement) 205 is provided inside the cavity 204 and may include two back-to-back actuators 206 and 208, which may be electromagnetic. The actuation mechanism may be fixed relative to the tank 202 through a support element 209, which may be a bracket. In one application, one or more than two electromagnetic actuators are used. Each actuator may include a coil 206a or 208a configured to electromagnetically displace a corresponding piston 206b or 208b. Alternatively, the piston may be driven by a motor and cam system at a frequency geared to the motor speed. A fluid 212 is disposed inside the tank for transmitting the pressure created by the pistons to the walls of the tank, thus creating the seismic waves. However, for being efficient, such a source needs a very good coupling between the external walls of the tank and the interior of the well. For that reason, it is customary to pour concrete or another material over the tank so that a good contact is achieved between the source and the well.

The above discussed sources are not configured to advance inside of a well during a non-vertical portion of the well. Thus, there is a need to have a small size seismic source that can fit inside of a well, can advance through the well even if the well is not vertical, and can generate seismic waves while being in a non-vertical position.

BRIEF SUMMARY OF THE INVENTION

According to an exemplary embodiment, there is a reaction mass seismic source that is located in an underground casing. The seismic source includes a non-planar base plate; a reaction mass located on the non-planar base plate; and a flextensional element housed in a recess of the reaction mass and configured to vibrate the non-planar base plate when actuated, to generate seismic waves underground.

According to another embodiment, there is a reaction mass seismic source that is located in an underground casing. The seismic source includes plural individual source elements connected to each other. A source element includes the elements noted in the above paragraph.

According to still another embodiment, there is a method for generating seismic waves in a non-vertical borehole. The method includes positioning a source element in a non-vertical borehole; extending a coupling element to push a non-planar base plate of the source element against a wall of the borehole; actuating a flextensional element located inside a reaction mass of the source element; and generating the seismic waves by vibrating the non-planar base plate with the flextensional element.

BRIEF DESCRIPTION OF THE DRAWINGS

For a more complete understanding of the present invention, reference is now made to the following descriptions taken in conjunction with the accompanying drawings, in which:

FIGS. 8A-D illustrate a reaction mass seismic source;

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic source used to perform a seismic survey in a well to evaluate the structure of a solid formation. However, the embodiments are not limited to a well or to land, but they may be applied to a marine environment, or to a seismic source buried in a trench.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a reaction mass seismic source has a base plate and a reaction mass located on the base plate. One or more flextensional elements located below or within the reaction mass are actuated for interacting with the base plate to generate seismic waves. This source is now discussed in more detail with regard to the figures.

Figure 1:
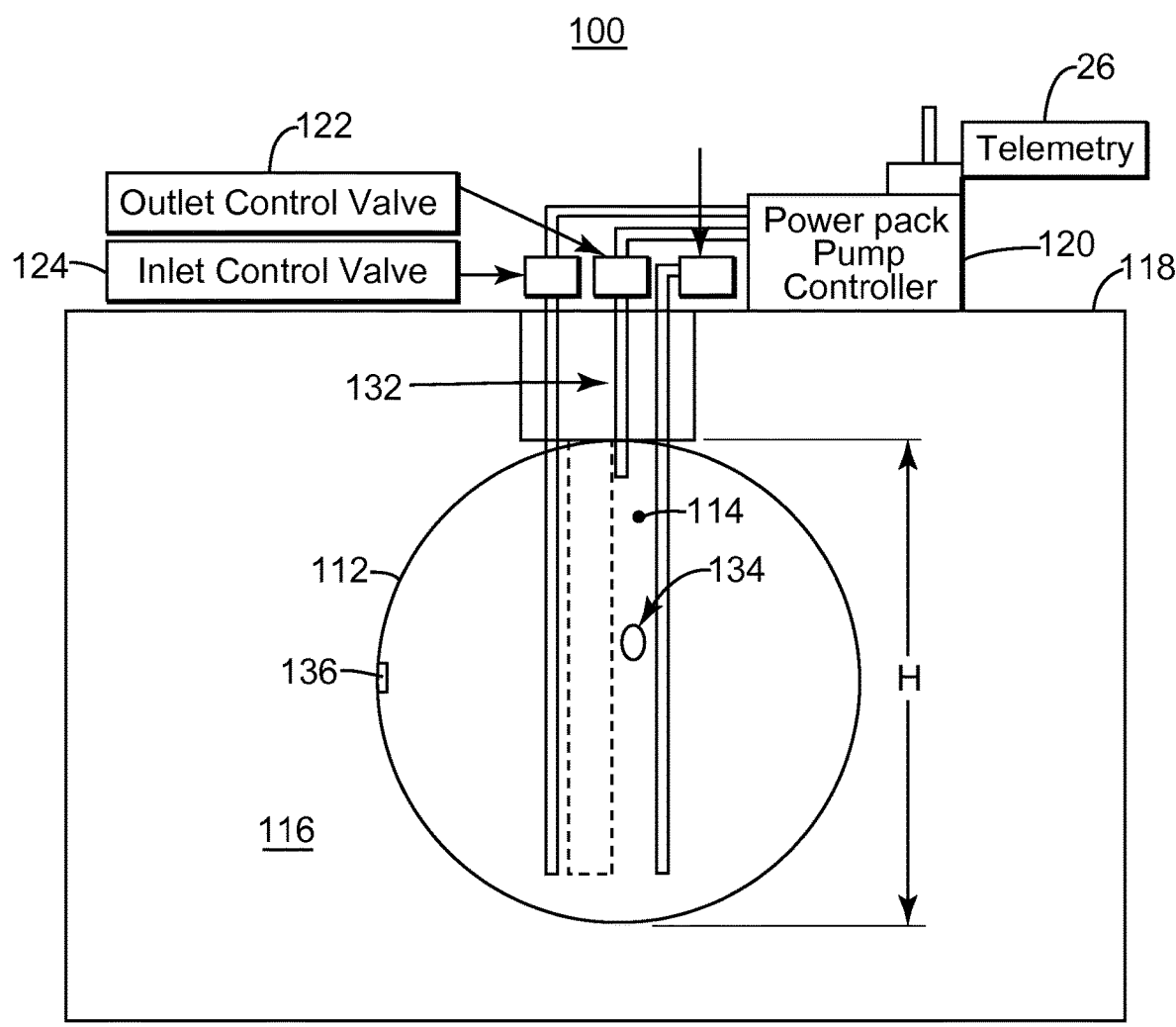
FIG. 1 is a schematic diagram of a land impulsive seismic source.
Figure 2:
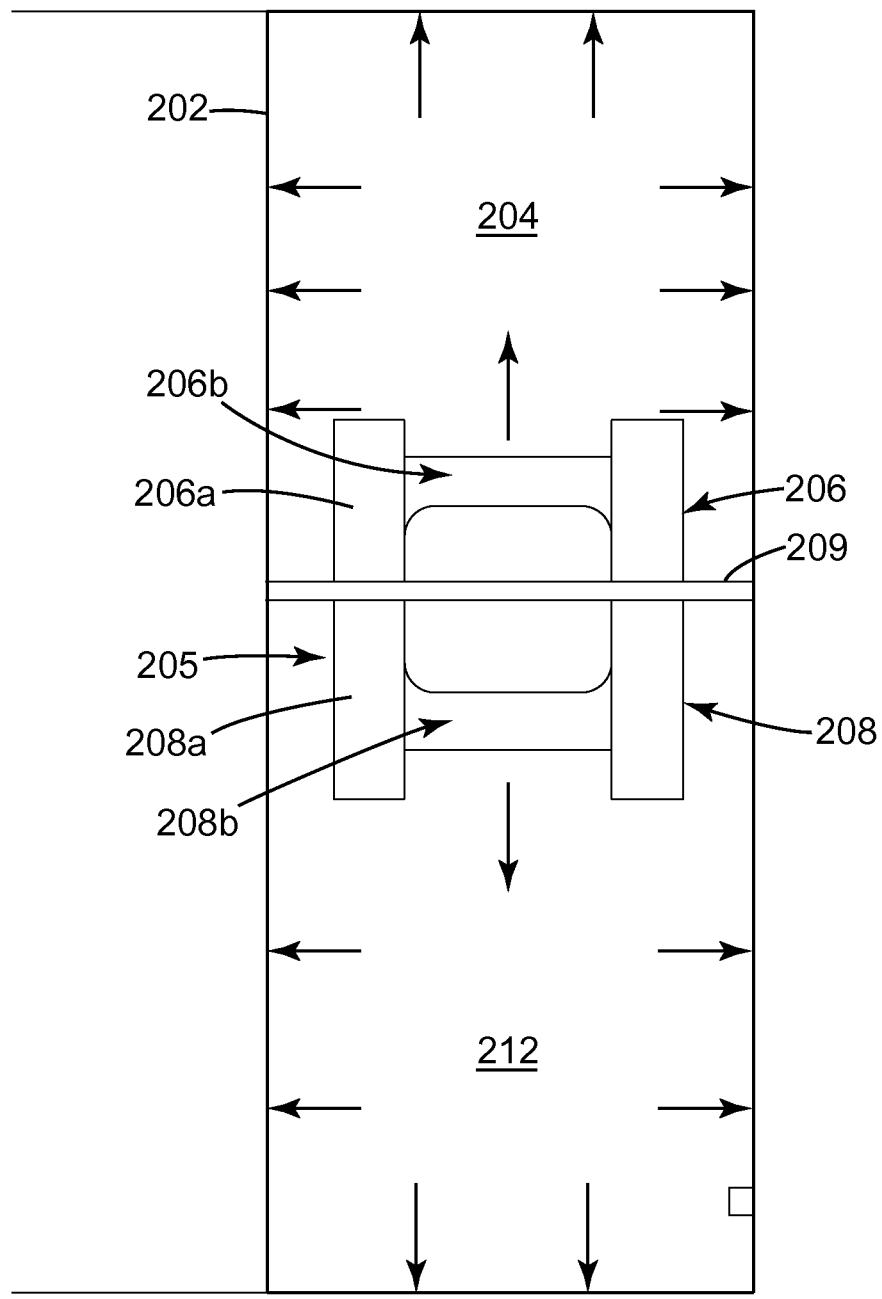
FIG. 2 is a schematic diagram of a land vibratory seismic source.
Figure 3:
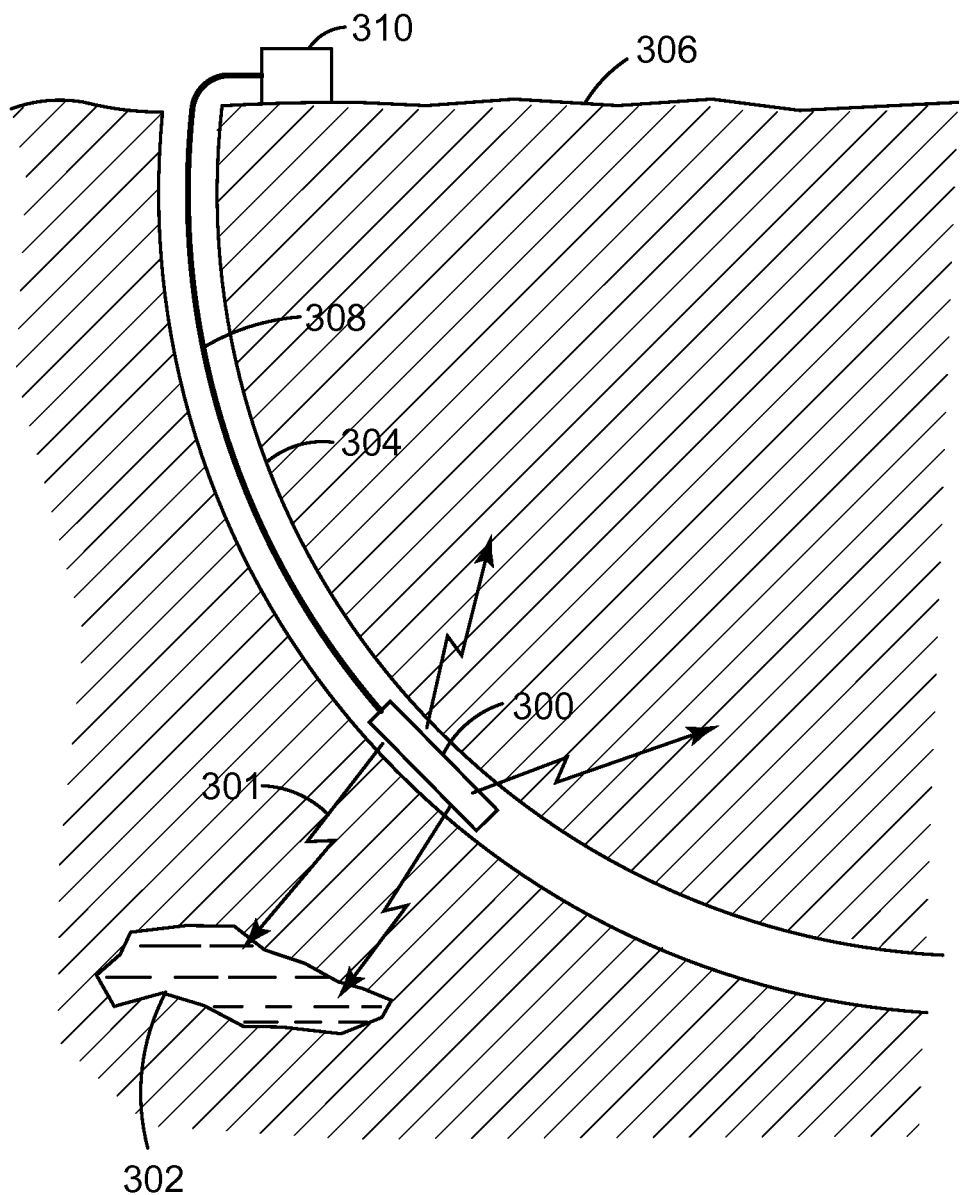
FIG. 3 illustrates a seismic source that is active in a non-vertical borehole.

According to an embodiment illustrated in FIG. 3, a reaction mass seismic source 300 generates enough seismic energy 301 for surveying underground formations 302 located around a borehole 304. Borehole 304 extends from the earth's surface 306 to a given depth and part of the borehole is not vertical as illustrated in the figure. Reaction mass seismic source 300 is connected to a cable 308 to a control device 310, located on the ground. In one embodiment, it is possible to locate the control device 310 inside the borehole. Cable 308 may be configured to transmit power and/or data (e.g., signals from the control device to the source and seismic related data from the seismic source to the control device).

Figure 4:
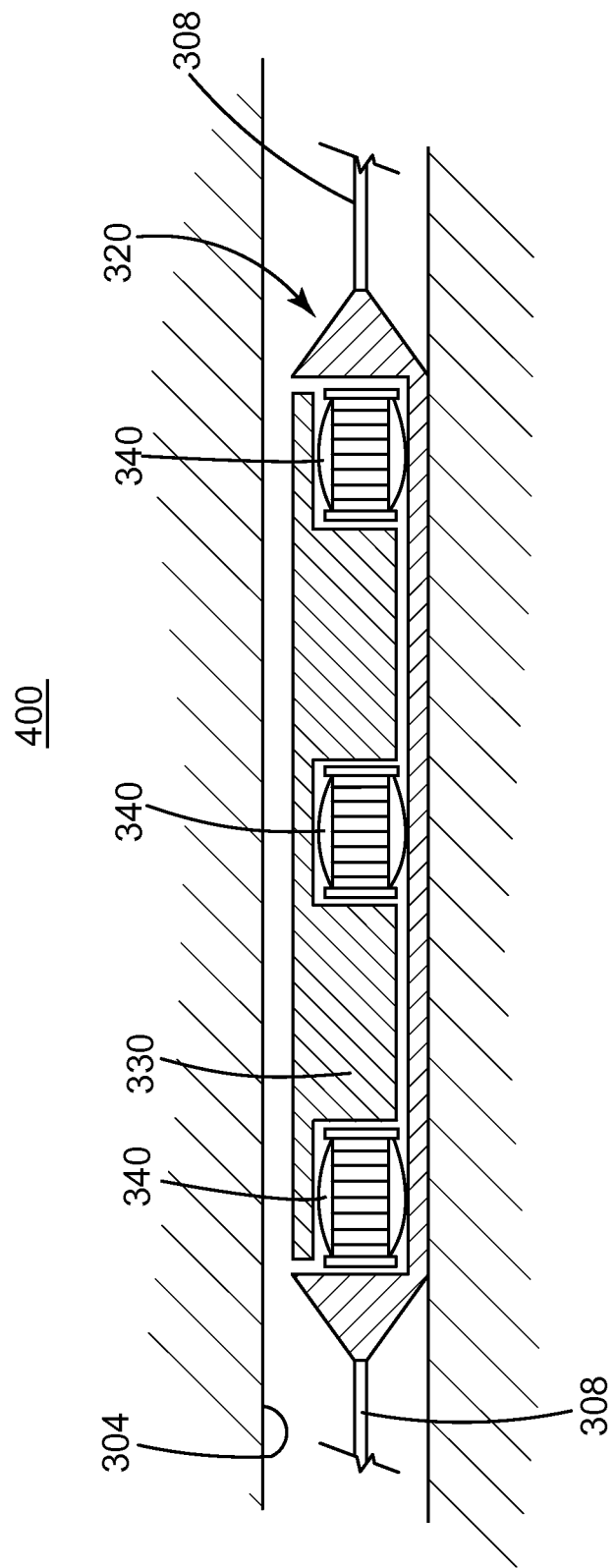
FIG. 4 illustrates a reaction mass seismic source.

Reaction mass seismic source 400 (the source herein) is generically illustrated in FIG. 4 as being located in a substantially horizontal borehole 304. Cables 308 are linked to both ends of the housing 320 of the source 300. Housing 320 hosts a reaction mass 330 and one or more flextensional elements 340. Reaction mass 330 is supposed to be heavy enough so that flextensional elements 340, when excited, vibrate a bottom wall of the housing to generate a seismic wave. The bottom wall of the housing acts as a base plate of a traditional surface seismic vibrator. The structure of source 300/400 is now discussed in more detail with regard to FIG. 5.

Figure 5:
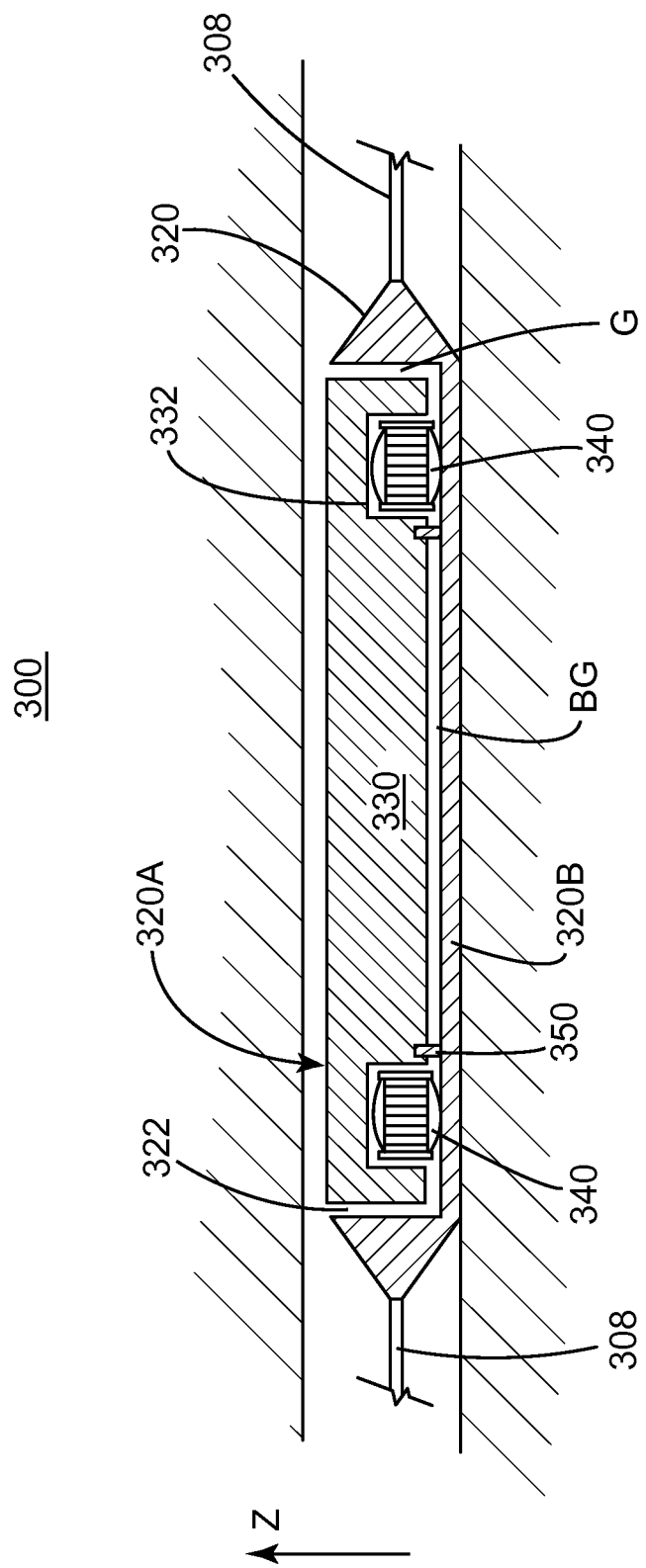
FIGS. 5-6 illustrate details of a reaction mass seismic source having one or more flextensional elements.

FIG. 5 shows housing 320 defining an internal cavity 322 in which the reaction mass 330 is placed. Note that housing 320 is open at the top region 320A so that it communicates with the well in which the source is placed. Reaction mass 330 is dimensioned in such a way that the total structure of the source 300 almost fully occupies the borehole. In one embodiment, the maximum diameter of the source is given by the tolerance required to move the source into the well. Note that in order to generate enough seismic energy in the low frequencies, the reaction mass 330 should be as large as possible. In one embodiment, reaction mass 330 is in the order of hundreds of kg. In one application, the reaction mass is between 100 and 400 kg (or even between 100 to 1000 kg). One skilled in the art would understand that different reaction masses may be used depending on the number of flextensional elements, their characteristics, and the frequency spectrum needed to be injected into the ground. However, the size of the borehole limits the size of housing 320, especially its outside diameter. It is customary in the drilling industry to have boreholes having an internal diameter between 10 and 50 cm. Thus, especially for the 10 cm borehole, the available volume inside the source is limited. For this reason, the length of the source is selected to accommodate a big/heavy enough reaction mass.

Reaction mass 330 may be made of a heavy material, for example, steel. The shape of the reaction mass may match the internal shape of housing 320 for providing the largest amount of material inside the source. FIG. 5 shows that a lateral gap G between the reaction mass 330 and the internal walls of the housing 320 is small (e.g., in the order of mm or μm). A bottom gap BG between the reaction mass and the housing is desired to be maintained so that the reaction mass can freely move relative to the housing.

In order to generate the seismic waves, the flextensional elements 340 are placed between the reaction mass 330 and the wall 320B that acts as the base plate, as now discussed with regard to FIG. 5. Considering that the gravity is oriented opposite to axis Z in FIG. 5, flextensional elements 340 will push the reaction mass 330 along the positive direction of axis Z when they are actuated. Because of the weight of the reaction mass, the flextensional elements 340 will also push the base plate 320B along the opposite direction of the Z axis. This means, that flextensional elements 340 will vibrate the base plate 320B, generating the seismic waves.

Figure 6:
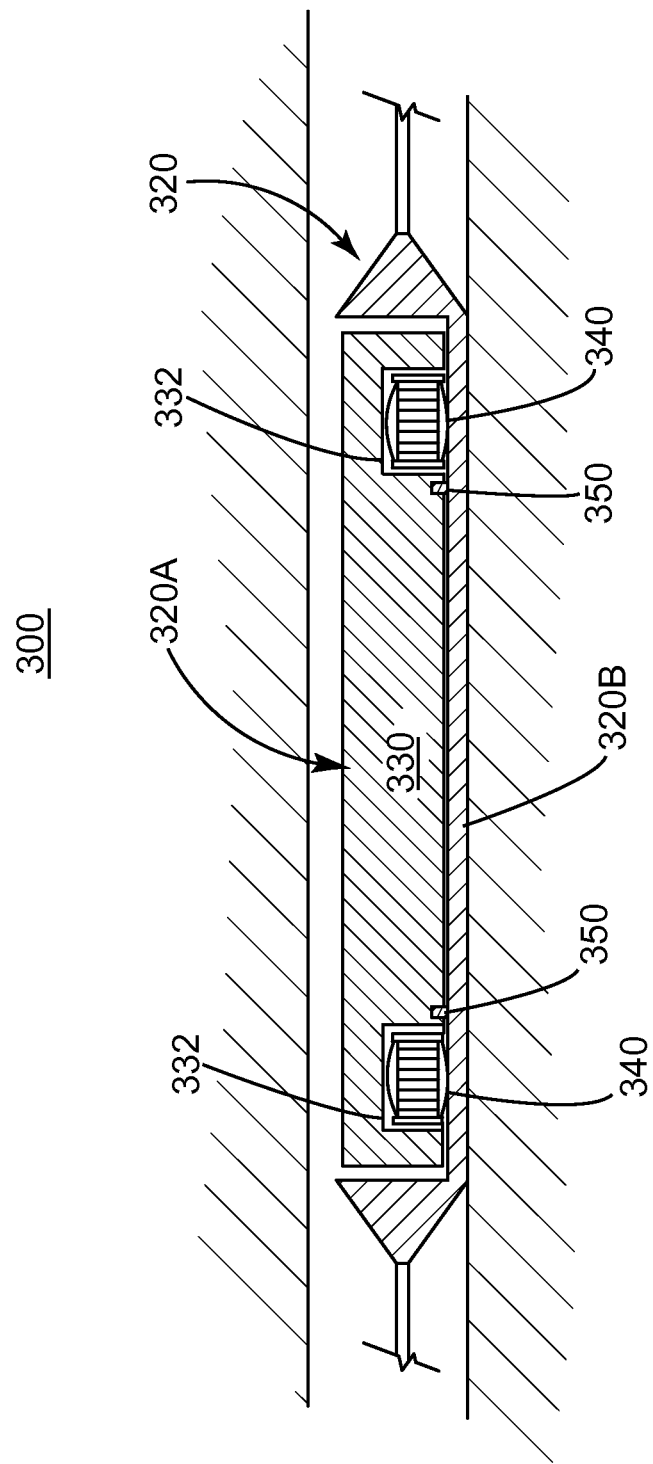

More specifically, FIG. 6 shows flextensional elements 340 not being actuated, which means that reaction mass 330 sits on support devices 350, not touching base plate 320B. When flextensional elements 340 are activated, as illustrated in FIG. 5, the flextensional element or another element connected to the flextensional element vibrate the base plate 320B. In this way, seismic energy is generated by the pressure exerted by the flextensional element on the base plate. If the base plate 320B is in direct contact with the walls of the borehole, as will be discussed later, that energy is transmitted into the underground as seismic energy.

To achieve the desired force on the base plate, more than one flextensional elements may be used. As illustrated in FIGS. 5-6, the flextensional elements are housed inside dedicated recesses 332 formed in the reaction mass 330. In one application, a depth of recesses 332 is sized to completely receive inside the flextensional elements when they are not actuated. However, one skilled in the art would understand that the novel embodiments would work even when the flextensional elements do not fully fit inside the recesses.

The number of flextensional elements to be used for a given reaction mass seismic source may vary. For example, in one embodiment, a reaction mass seismic source includes between 2 and 10 flextensional elements. The more flextensional elements are activated, the more force is applied to the base plate. In one application, assume that 10 flextensional elements are located inside the reaction mass. A controller 310 as illustrated in FIG. 3, may be configured to activate "n" flextensional elements at a given time t1 (where n is smaller than 10), and "m" flextensional elements at a later time t2 (where m is different from n). This means that the reaction mass source may be dynamically adjusted to generate more or less force as required by the seismic survey. In one embodiment, controller 310 may be located on the source, or distributed between the source and the ground.

Figure 7:
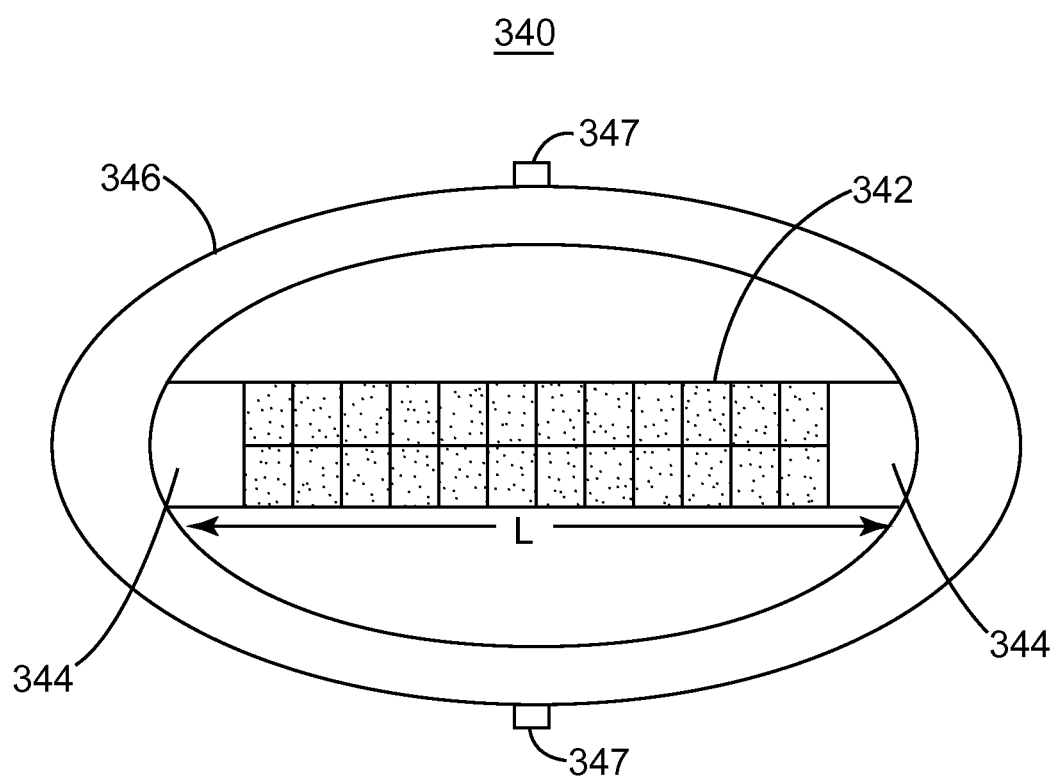
FIG. 7 illustrates a flextensional element.

FIG. 7 illustrates one possible implementation of the flextensional element 340. While the flextensional element may be electrically, pneumatically, electromagnetically or magneto-restrictive actuated, FIG. 7 shows a piezoelectric based flextensional element. Flextensional element 340 includes an active element 342, insulators 344 and an elastic element 346. Active element 342 may include one or more piezoelectric elements. FIG. 7 shows a plurality of piezoelectric elements attached to each other to form a bar. At the end of the active element 342, there are insulators 344 that prevent an electric current sent to the piezoelectric elements entering into the elastic element 346. Elastic element 346 may be made out of any elastic material, for example, steel. When the piezoelectric elements are not actuated, i.e., no electric current or voltage is applied to the elements, they have a certain size, which make the entire bar to have a certain length L. However, when a voltage is applied to the active element, its length L changes, either increasing or decreasing depending on the polarity of the applied voltage. By changing the length L of the bar, the shape of the elastic element 346 changes, becoming either more curved as illustrated in FIG. 5, or less curved as illustrated in FIG. 6. Although the figures are not at scale, the flextensional elements in FIGS. 5 and 6 illustrate the idea of changing the shape under an applied voltage. Those skilled in the art would know that other type of flextensional elements may be used, for example, pneumatically activated, etc. Elastic element 346 may have a mounting block or attachment point 347 as illustrated in FIG. 7, for connection to the reaction mass and base plate.

A specific implementation of the reaction mass source element discussed above is illustrated in FIGS. 8A-D. FIG. 8A shows reaction mass source element 800 being located inside a casing 804. Reaction mass 830 is placed above base plate 820B as also illustrated in FIGS. 8B and 8C. Support devices 850 include a spring housed in a corresponding recess 834 formed in the reaction mass 830. Support device 850 contacts base plate 820B and supports the reaction mass' weight so that the reaction mass's mass does not load the flextensional elements 840. In other words, the weight of the reaction mass is not supported by flextensional elements 840 and a guidance piston 848 (if present), but rather by support device 850. In one application, the support device 850 is fixedly attached to both the reaction mass and the base plate. In one embodiment, support device 850 may include a sleeve guide or guide post for preventing the reaction mass on applying a shear load on the flextensional elements when the source is in a vertical position. Base plate 820B is shown in FIGS. 8B and 8C as having an arc of a circle cross-section and only partially surrounding the reaction mass 830. This means that base plate 820B is non-planar, e.g., curved. In this embodiment, the entire housing 820 is the base plate 820B. Thus, in this embodiment, the term base plate is used interchangeably with the term base plate. FIGS. 8B-C show the reaction mass having a circular cross-section. In one application, the radius of the base plate is different from the radius of the reaction mass, as illustrated in FIG. 8C. In another application, the base plate's radius is larger than the reaction mass' radius.

Flextensional element 840 is located inside a recess 832 formed in the reaction mass 830. A cover plate 849 may cover recess 832, as illustrated in FIG. 8A, for maintaining inside the recess the flextensional element 840. Cover plate 849 may be attached with bolts, for example, to reacting mass 830. In order to interact with the base plate 820B, the guidance piston 848 is provided, in this embodiment, between elastic element 846 and base plate 820B. Thus, while support devices 850 maintain the reaction mass suspended above the base plate (the gap between the two elements may be in the mm or μm range), the flextensional elements 840, when excited, vibrate guidance pistons 848, which directly interact with the base plate 820B, thus generating the seismic waves. In one embodiment, it is possible to not use guidance piston 848 and rather locate the flextensional element 840 close enough to the base plate to vibrate it directly.

To couple the base plate 820B to the wall of the casing 804, for better transmitting the seismic energy into the earth, one or more coupling devices 860 are located on the reaction mass seismic source as illustrated in FIGS. 8A-C. Coupling device 860 has a base portion 862 that is fixedly attached to base plate 820B. Reaction mass 830 has corresponding holes 836 that accommodate the base portion 862 so that the reaction mass can freely move relative to the base plate. A coupling piston 864 is connected to a rod 866, which slides inside base portion 862. A fluid 868 is provided inside base portion 862 and it can pressurized to move rod 866 up and down. For example, when fluid 868 is pressurized, it moves rod 866 up. When no more pressure is applied to the fluid and it is allowed to move back to a storing tank (not shown), rod 866 is retrieved. To enhance the retrieval action, a tension spring may be provided. Alternatively, a motor or other electromagnetic device may be located inside base portion 862 for actuating rod 866 and coupling piston 864 up and down.

When coupling piston 864 presses against the wall of casing 804, as shown in FIGS. 8A and 8C, the base plate 820B is also pressed against an opposite wall of the casing, achieving the desired coupling. When the flextensional element 840 is activated, it expands so that guidance piston 848 vibrates the base plate, generating the seismic energy. Reaction mass 830 is not directly interacting with the base plate and provides a backing for the flextensional elements. Electrical connections between the flextensional element and surface and/or coupling device 860 and surface are not shown herein for simplicity. However, these connections are incorporated inside cable 308 illustrated in FIG. 3. Because of this particular configuration of the seismic source, it can shoot from a vertical position, a non-vertical position, or a horizontal position. In other words, the seismic source can shoot from any position. Also, the seismic source can travel through the casing, for example, by being assisted by cable 308. Cable 308 may include, in addition to data and/or power cables, hydraulic and/or pneumatic lines, and a strength cable for supporting the seismic source and for pulling it through the casing. In one embodiment, a tractor is used inside the casing for pulling the seismic source at the desired location.

In one embodiment, the reaction mass has a cylindrical shape. As the reaction mass seismic source 800 may travel through casing 804, it has an external diameter less than an internal diameter of the casing 804, as illustrated in FIG. 8C. However, it is desirable that an orientation of the seismic source is always aligned with the Z axis so that the coupling piston 864 is always at the top of the source and the base plate is at the bottom of the source. This specific orientation is achieved due to the fact that the center of mass (CM) of the entire source is lower than the geometric center (GC), as illustrated in FIG. 8D. Due to this specific arrangement, when seismic source 800 travels through the casing 804, the CM positioned itself lower than the GC and the desired orientation is achieved.

Figure 9:
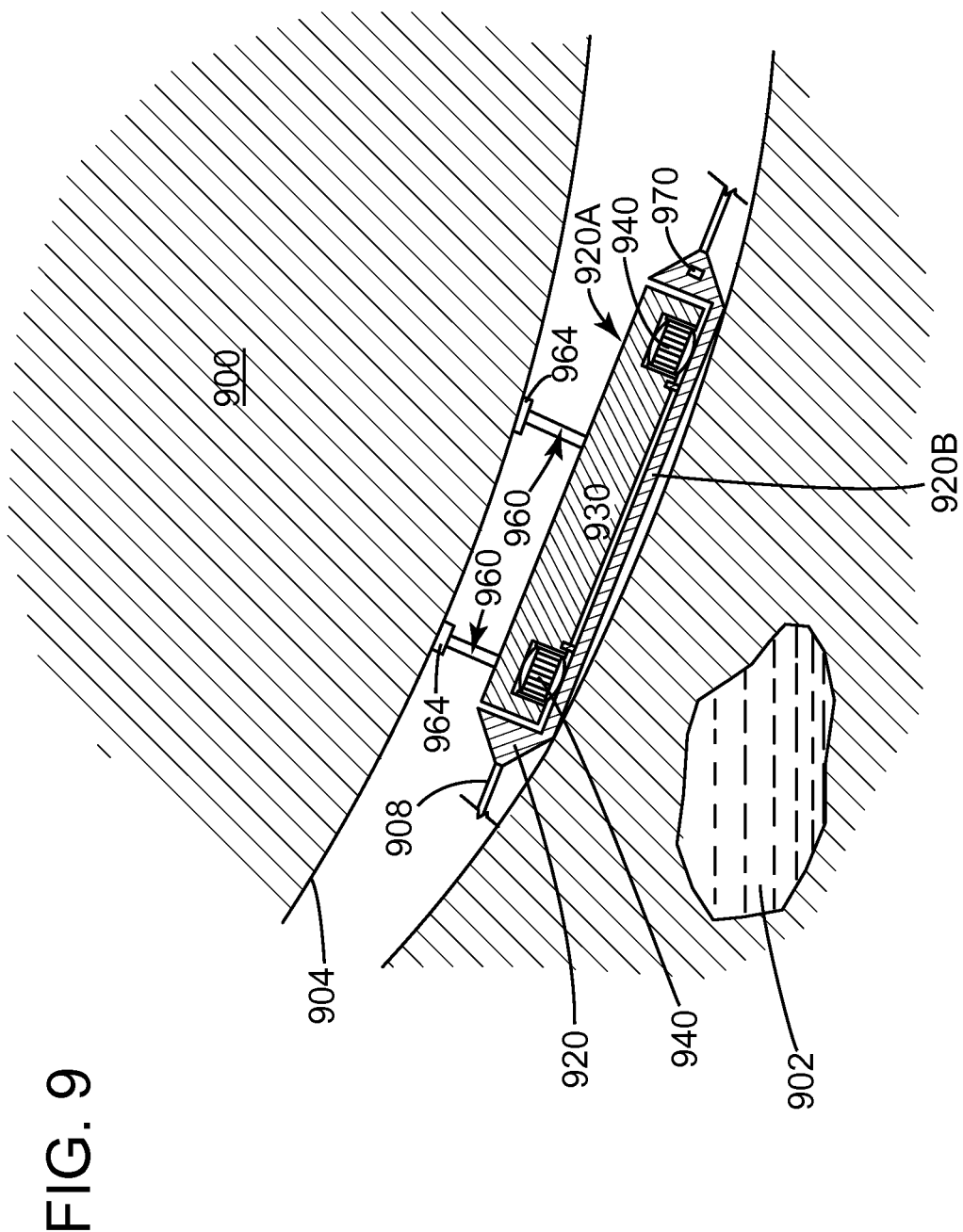
FIG. 9 illustrates a reaction mass seismic source in a non-vertical borehole.

FIG. 9 shows a reaction mass seismic source 900 located inside a non-vertical borehole 904. Two coupling mechanisms 960 are located at the front and tail ends of the housing and they press against the internal wall of the borehole 904 for ensuring that bottom part 920B of the source is in direct contact with the wall of the borehole. Coupling mechanisms 960 may be simply two telescopic arms having end pads 964. The telescopic arms may be fully retracted inside the housing 920 while the source advances through the borehole. After the intended position of the housing inside the borehole is achieved, the telescopic arms are extended until they press against the wall of the borehole. In one embodiment, the arms are not telescopic, but they can be folded to be accommodated by the housing. The telescopic arms may be activated electrically, hydraulically, pneumatically, etc. If it is not desired to move the source through the borehole, it is possible to cement in place the source. It is noted that top portion 920A of housing 920 is missing, consistent with the previously discussed embodiments. However, in one embodiment, it is possible to add a rubber boot to cover the entire top portion 920A and to seal in this way an inside of the housing. If the source is cemented, the reaction mass has to be housed in such a way to be isolated from the cement and remain free to move.

A local control device 970 may be housed inside the housing 920 or attached to the housing 920 and connected to the flextensional elements 940 and coupling mechanisms 960. Local control device 970 may instruct each of these mechanisms when to act. The local control device may be programmed when and for how long to actuate these mechanisms. In another embodiment, the local control device 970 communicates with the global control mechanism 310 (see FIG. 3), located at the surface, and together they activate the flextensional elements and the coupling mechanisms.

As the diameter of the borehole is small, and the reaction mass needs to be large enough to produce the seismic energy, a length of the source may be in the order of meters. However, a factor that is considered when designing the source is the capability of the source to travel through the borehole. Given that this novel source is capable of emitting seismic energy in a non-vertical borehole, as illustrated in FIG. 9, it needs to travel from the earth's surface to the given depth through the curved borehole. For this reason, the length of the source may be limited by the curvature of the borehole.

Figure 10:
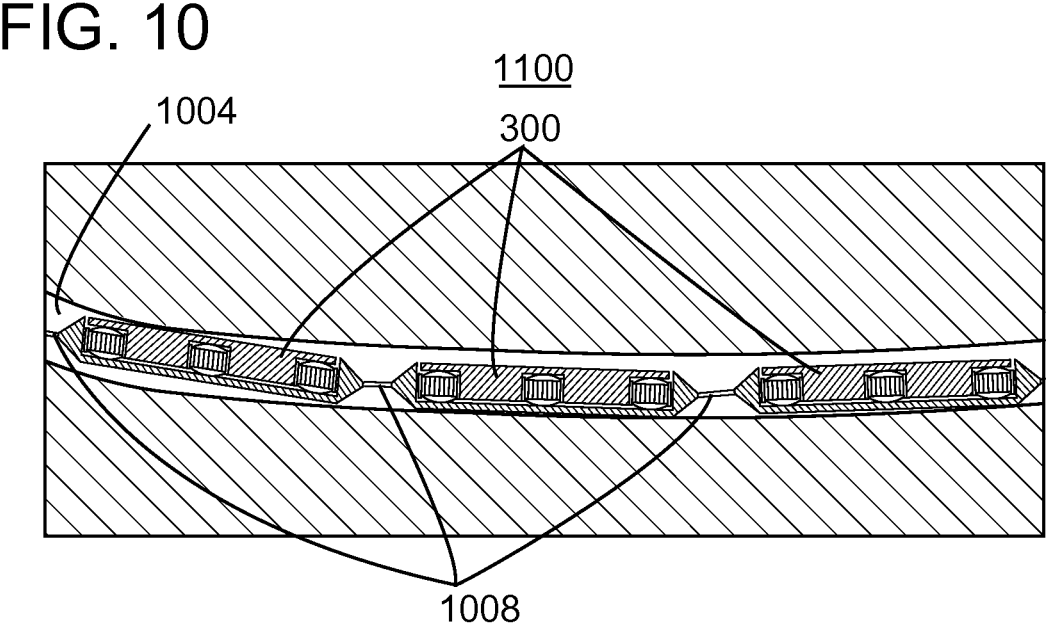
FIG. 10 illustrates a reaction mass seismic source having multiple source elements.

According to an embodiment illustrated in FIG. 10, a source 1000 may include multiple single sources 300 linked to each other by corresponding cables 1008. In this way, source 1000 can easily travel inside borehole 1004 although its length may reach tens of meters. Each seismic source 300 may have any of the configurations discussed above or any combination of these configurations.

Figure 11:
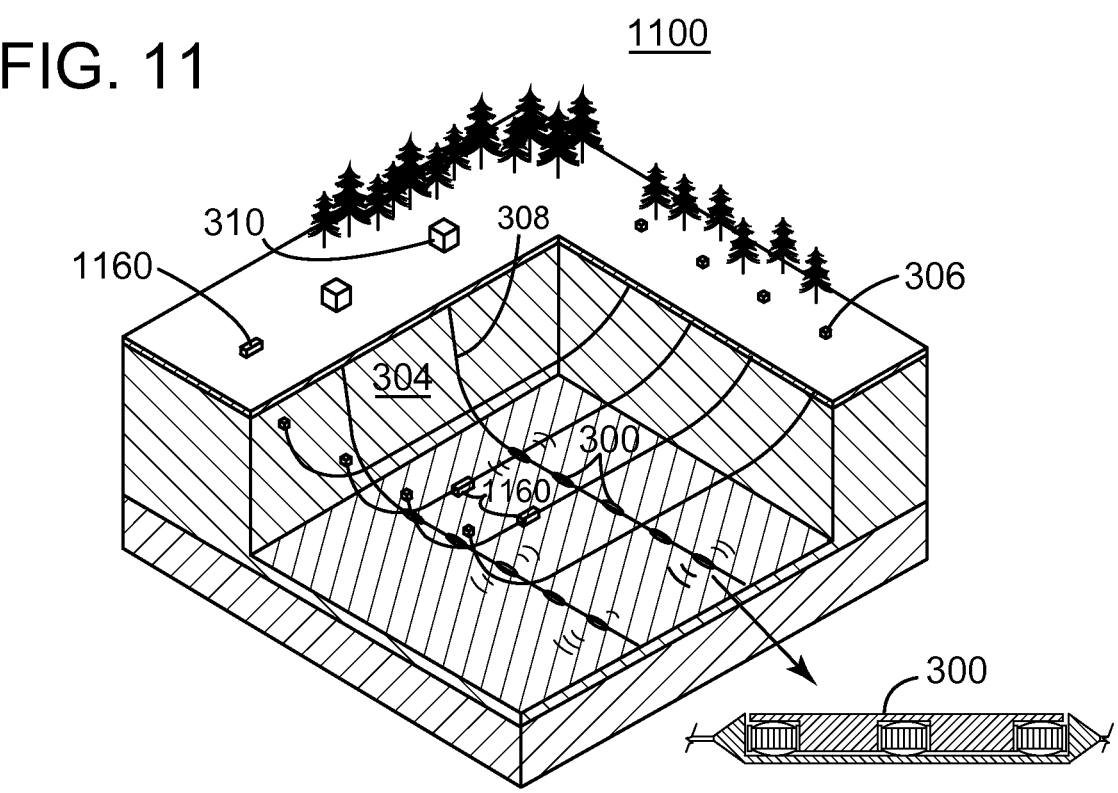
FIG. 11 illustrates a land seismic survey that uses reaction mass seismic sources.

FIG. 11 illustrates an actual seismic survey 1100 taking place on land and having plural sources 300 distributed in plural boreholes 304. Sources 300 are connected to each other through cables 308 and then to a surface control device 310. Control device 310 may include a dedicated processor that transmits firing instructions to each source. Also, the seismic survey 1100 may also have plural sensors 1160 either buried underground or located on the earth's surface 306.

Figure 12:
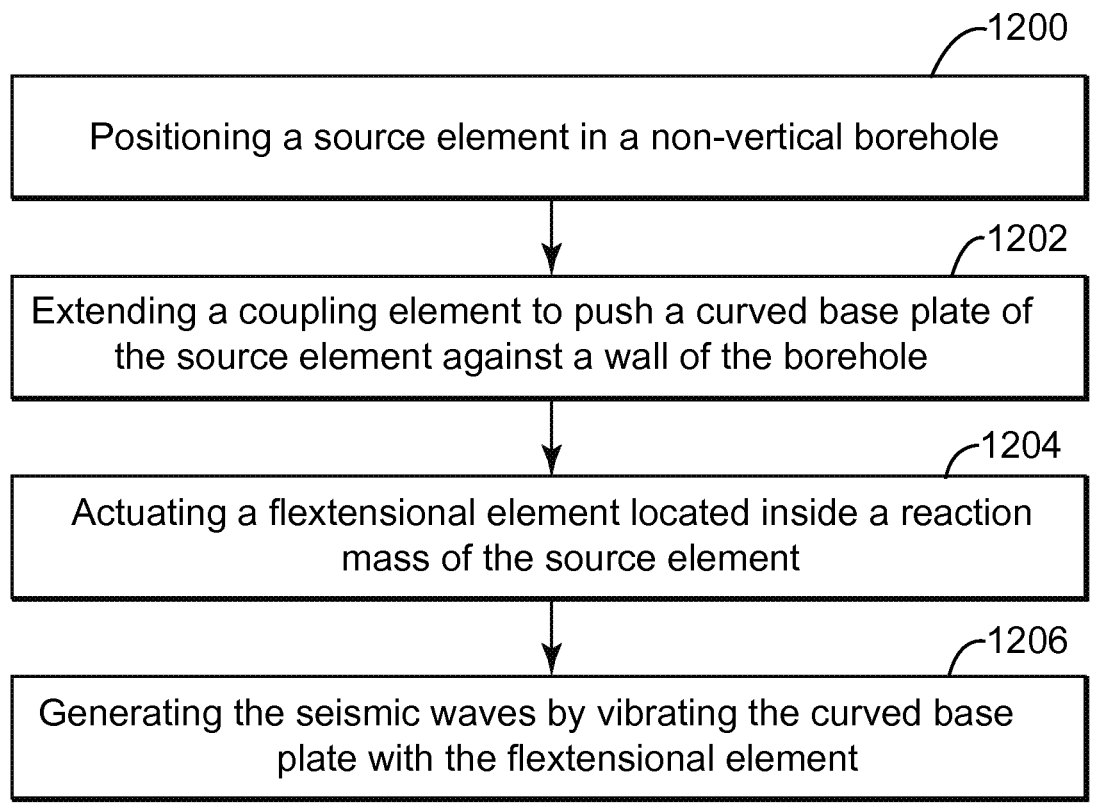
FIG. 12 if a flowchart of a method for performing a land seismic survey using a reaction mass source.

According to another embodiment illustrated in FIG. 12, there is a method for conducting a seismic survey of an underground subsurface with a seismic source located in a non-horizontal well. The method includes a step 1200 of positioning a source element in a non-vertical borehole, a step 1202 of extending a coupling element to push a non-planar (e.g., curved) base plate of the source element against a wall of the borehole, a step 1204 of actuating a flextensional element located inside a reaction mass of the source element, and a step 1206 of generating the seismic waves by vibrating the curved base plate with the flextensional element. The method may include a step of supporting the reaction mass with a support device so that the reaction mass does not touch the curved base plate, and/or a step of retracting the coupling element within the reaction mass and moving the source element to a new position within the non-vertical borehole. The coupling element may be attached to the curved base plate and extends through the reaction mass.

Figure 13:
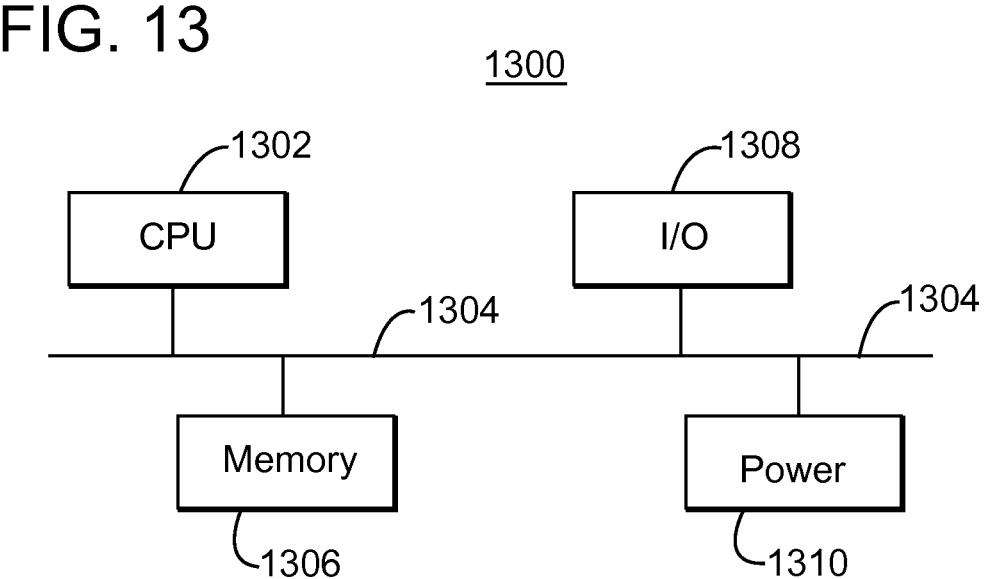
FIG. 13 illustrates a controller that runs one or more methods discussed herein.

Control devices 310 or 970 are illustrated in FIG. 13. The control device 1300 may include a processor 1302 that is connected through a bus 904 to a storage device 1306. Computing device 1300 may also include an input/output interface 1308 through which data can be exchanged with the processor and/or storage device. For example, a keyboard, mouse or other device may be connected to the input/output interface 1308 to send commands to the processor and/or to collect data stored in storage device or to provide data necessary to the processor. In one application, the processor sends instructions to the flextensional devices, selects which flextensional devices to actuate, and also can actuate the coupling mechanisms. All this information may be provided by cable 308 through the input/output interface. A power supply may provide power via power interface 1310. The power supply may be located on the surface, in which case cable 308 supplies the power to the power interface 1310, or the power supply may be located on the seismic source.

The disclosed exemplary embodiments provide a reaction mass seismic source and related methods for generating seismic waves in a non-vertical borehole. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A reaction mass seismic source configured to advance through and operate in a non-vertical underground casing, the seismic source comprising:
   a base plate;
   a reaction mass located above the base plate to press the base plate toward a wall of the non-vertical underground casing; and
   a flextensional element located between the reaction mass and the base plate and configured to generate seismic waves underground when actuated.

2. The seismic source of claim 1, further comprising:
   a guidance piston located between the flextensional element and the base plate.

3. The seismic source of claim 1, wherein the flextensional element comprises:
   a piezoelectric element that changes its size when actuated by a voltage; and
   an elastic element located around the piezoelectric element and configured to change its shape when the piezoelectric element is actuated.

4. The seismic source of claim 1, further comprising:
   support devices located between the reaction mass and the base plate and configured to support a weight of the reaction mass such that the flextensional element is protected from the weight of the reaction mass.

5. The seismic source of claim 1, wherein a weight of the base plate is between 200 and 400 kg.

6. The seismic source of claim 1, wherein the flextensional element includes between one and ten flextensional elements.

7. The seismic source of claim 1, further comprising:
   a coupling element configured to be in a retracted state when the seismic source travels through the non-vertical underground casing and to press against the wall of the casing at a location opposite to where the base plate presses the wall when the seismic source is at a shooting location.

8. The seismic source of claim 1, wherein a center of mass of the seismic source is lower than a geometric center so that the base plate remains below the reaction mass when the source travels through the non-vertical underground casing.

9. The seismic source of claim 1, wherein the base plate has end portions along a moving direction to house the reaction mass.

10. A reaction mass seismic source configured to advance through and operate in a non-vertical underground casing, the seismic source comprising:
    plural individual source elements connected to each other, each of the source elements comprising:
    a base plate;
    a reaction mass located above the base plate to press the baseplate toward a wall of the non-vertical underground casing; and
    a flextensional element housed in a recess of the reaction mass and configured to vibrate to generate seismic waves when actuated.

11. The seismic source of claim 10, wherein the flextensional element comprises:
    a piezoelectric element that changes its size when actuated by a voltage; and an elastic element located around the piezoelectric element and configured to change its shape when the piezoelectric element is actuated.

12. The seismic source of claim 10, wherein the source element further comprises:
    support devices located between the reaction mass and the base plate and configured to support a weight of the reaction mass such that the reaction mass does not touch the base plate.

13. The seismic source of claim 10, wherein flextensional element includes between one and ten flextensional elements.

14. The seismic source of claim 10, wherein the source element further comprises:
    a coupling element configured to be in a retracted state when the seismic source element travels through the non-vertical underground casing and to press against the wall of the casing at a location opposite to where the base plate presses with the wall when the seismic source element is at a shooting location.

15. The seismic source of claim 10, wherein a center of mass of each of the seismic source elements is lower than a geometric center so that the base plate is below the reaction mass.

16. The seismic source of claim 10, wherein the base plate has end portions along a moving direction to house the reaction mass.

17. A method for generating seismic waves in a non-vertical borehole, the method comprising:
    positioning a source element inside the non-vertical borehole, with a reaction mass of the source element remaining over a base plate thereof;
    extending a coupling element to push the base plate against a wall of the borehole;
    actuating a flextensional element located in a recess inside the reaction mass, the recess opening toward the base plate; and
    generating the seismic waves in the base plate by the actuated flextensional element.

18. The method of claim 17, further comprising:
    supporting the reaction mass with a support device so that the reaction mass does not touch the base plate.

19. The method of claim 17, wherein the coupling element is attached to the base plate and extends through the reaction mass.

20. The method of claim 17, further comprising:
    retracting the coupling element within the reaction mass; and
    moving the source element to a new position within the non-vertical borehole.

* * * * *